WAVE-SIGNAL COMMUNICATION SYSTEM

Filed April 2, 1949 5 Sheets-Sheet 1

INVENTOR.
ARTHUR V. LOUGHREN

BY Laurence B. Dodds

ATTORNEY

Nov. 6, 1951 A. V. LOUGHREN 2,574,271

WAVE-SIGNAL COMMUNICATION SYSTEM

Filed April 2, 1949 5 Sheets-Sheet 2

INVENTOR.
ARTHUR V. LOUGHREN

BY Lawrence B. Dodds

ATTORNEY

Nov. 6, 1951 A. V. LOUGHREN 2,574,271

WAVE-SIGNAL COMMUNICATION SYSTEM

Filed April 2, 1949 5 Sheets-Sheet 3

INVENTOR.
ARTHUR V. LOUGHREN
BY Laurence B. Dodds
ATTORNEY

Nov. 6, 1951 A. V. LOUGHREN 2,574,271

WAVE-SIGNAL COMMUNICATION SYSTEM

Filed April 2, 1949 5 Sheets-Sheet 4

INVENTOR.
ARTHUR V. LOUGHREN

BY Laurence B. Dodds

ATTORNEY

WAVE-SIGNAL COMMUNICATION SYSTEM

Filed April 2, 1949 5 Sheets-Sheet 5

INVENTOR.
ARTHUR V. LOUGHREN
BY Laurence B. Dodds
ATTORNEY

Patented Nov. 6, 1951 2,574,271

UNITED STATES PATENT OFFICE 2,574,271

WAVE-SIGNAL COMMUNICATION SYSTEM

Arthur V. Loughren, Great Neck, N. Y., assignor to Hazeltine Research, Inc., Chicago, Ill., a corporation of Illinois Application April 2, 1949, Serial No. 85,101

6 Claims. (Cl. 343—6)

Figure 9:
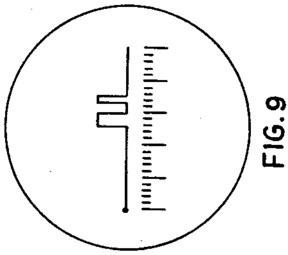

This invention relates to a wave-signal communication system and, more particularly, to a system for communication between two spaced wave-signal stations at least one of which is carried by a mobile object capable of entering various ones of different traffic zones in space.

To relieve traffic congestion where large numbers of mobile objects are involved, particularly when the mobile objects are aircraft, it has been proposed to establish automatic position-indicating systems permitting closer approaches of the mobile objects to each other without danger of collision. This may be done by dividing the space available to the mobile objects into zones, which may be fixed in space or may represent a safety zone fixed with reference to each mobile object to aid in the guiding thereof without collision hazards. For guiding aircraft it is convenient to establish altitude zones, so that the positions of near-by aircraft in the same altitude zone may be indicated to the exclusion of all other aircraft.

One such system using zonal traffic divisions provides a transmitter for sending wave signals coded to identify a particular traffic zone and also provides, spaced from the transmitter, a receiver for decoding these signals and utilizing them to indicate position or to send a reply signal whenever the receiver is adjusted to decode signals identifying that particular traffic zone. The transmitter or the receiver is aboard a mobile object, or both are carried by mobile objects, which may enter numerous traffic zones. The code may identify the traffic zones by distances from a fixed reference point; for example, it may identify altitude zones by altitude in feet above ground or above mean sea level or by "pressure altitude" in millibars of atmospheric pressure referred to the standard sea level atmospheric pressure of 1013 millibars. The transmitted wave signal is coded by modulating it with signal energy of pulse wave form having two relatively variable wave form portions. Thus, when the transmitter is aboard an aircraft, the modulation envelope of the transmitted wave may comprise two short pulses separated by an adjustable period of time automatically made proportional to the pressure in millibars indicated by a barometer on the aircraft. The receiver aboard another aircraft in the same altitude zone demodulates this wave and applies it to a decoder automatically adjusted by another barometer on that aircraft to translate the demodulated signal only when it comprises two pulses separated by the period of time corresponding to that altitude. A signal translated by the decoder may cause transmission of a reply signal. Such a system is described and claimed in an application of Knox McIlwain, Serial No. 617,020, filed September 18, 1945, now abandoned.

It is an object of the present invention to provide a novel signal-translating arrangement which exhibits improved operating characteristics not possessed by the described prior arrangements.

It is also an object of the invention to provide a new and improved decoding receiver, for use in a signal-translating system involving the coding and decoding of signals representing values in an extended total range of values, having unusually high reliability of operation of the decoding circuits of the receiver.

It is another object of the present invention to provide a new and improved system for communication between two spaced wave-signal stations, at least one of which is carried by a mobile object, which system is capable of utilizing selectively signals designating a large range of locations or traffic zones available to mobile objects and has improved arrangements for selecting a desired traffic zone.

It is a still further object of the invention to provide a wave-signal receiver suitable for use in a system for communication between two spaced wave-signal stations, at least one of which is carried by a mobile object, and one which is capable of utilizing selectively and with high accuracy of selection zone indicative signals which designate one traffic zone within an extensive total range of such zones available to mobile objects.

In accordance with one form of the invention, a system for communication between two spaced wave-signal stations at least one of which is carried by a mobile object comprises means at one of the stations for transmitting wave-signal energy having a first modulation characteristic including two pulse wave-form portions with a variable time separation for designating by the values of the time separations thereof individual ones of a plurality of traffic sectors available to mobile objects and having a second modulation characteristic including one of the aforesaid two pulse wave-form portions and including another pulse wave-form portion with a variable time separation designating by the values of the time separations thereof individual ones of a plurality of traffic zones located primarily within each of the traffic sectors individually designated by the first characteristic. The system includes means at the other of the stations for intercepting the wave-signal energy and for deriving therefrom signal energy including three pulse wave-form portions having the aforesaid two time separations, and means at the other station for utilizing the derived signal energy only when the time separations of the pulse wave-form portions thereof correspond to a particular traffic sector and zone selectable at the other station.

In accordance with another form of the invention, a wave-signal receiver, for use in a system for communication between two spaced wave-signal stations at least one of which is carried by a mobile object, comprises means for intercepting wave-signal energy having a first modulation characteristic including two pulse wave-form portions with a variable time separation for designating by the values of the time separations individual ones of a plurality of traffic sectors available to mobile objects, said wave-signal energy also having a second modulation characteristic including one of the aforesaid two pulse wave-form portions and including another pulse wave-form portion with a variable time separation designating by the values of the separations individual ones of a plurality of traffic zones located primarily within each of the traffic sectors individually designated by the aforesaid first characteristic. The wave-signal receiver also includes means for deriving from the intercepted wave-signal energy including three pulse wave-form portions having the aforesaid two time separations. The receiver further includes means for utilizing the derived signal energy only when the time separations of the pulse wave-form portions thereof correspond to a particular traffic sector and zone selectable at the receiver.

For a better understanding of the present invention, together with other and further objects thereof, reference is had to the following description taken in connection with the accompanying drawings, and its scope will be pointed out in the appended claims.

Figure 1:
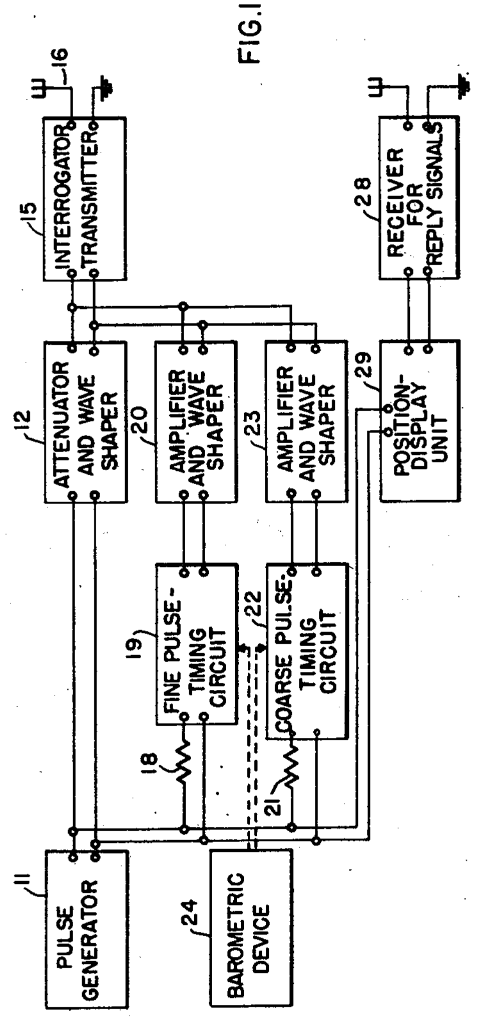
Figure 2:
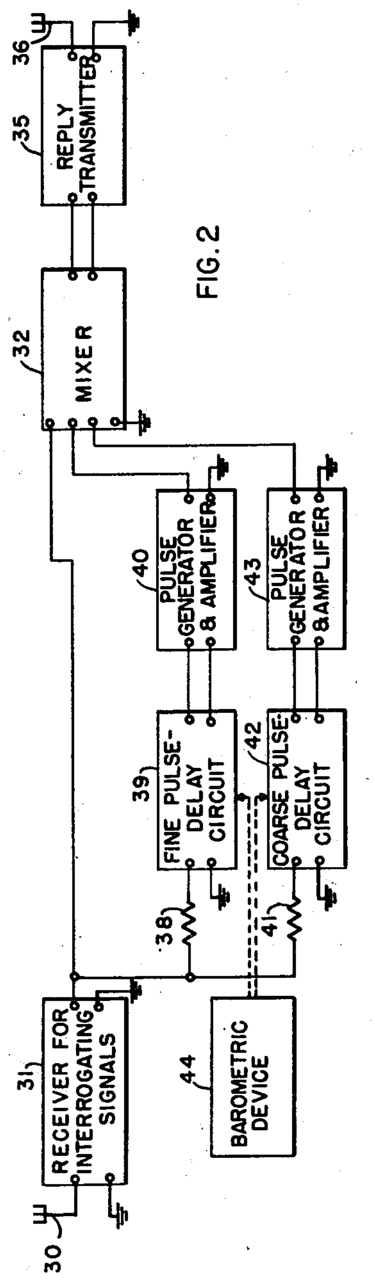
Figure 7:
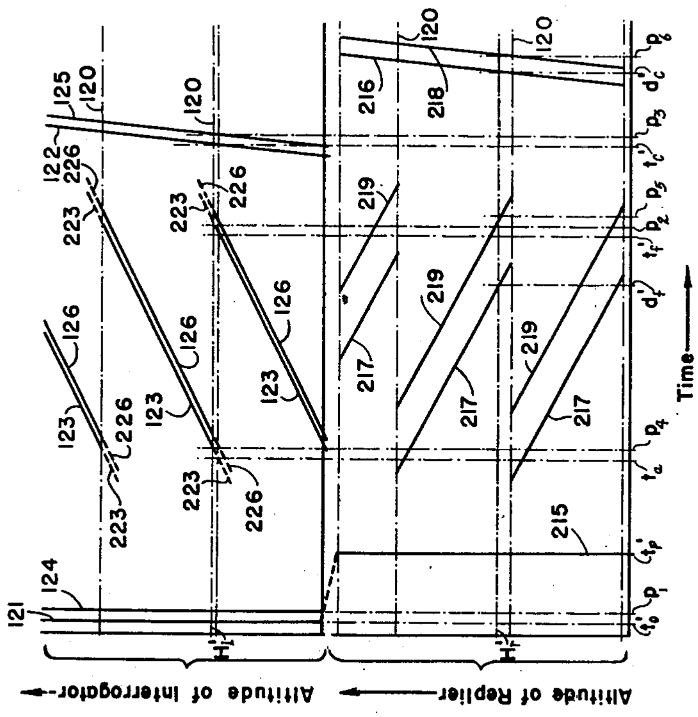
Figure 3:
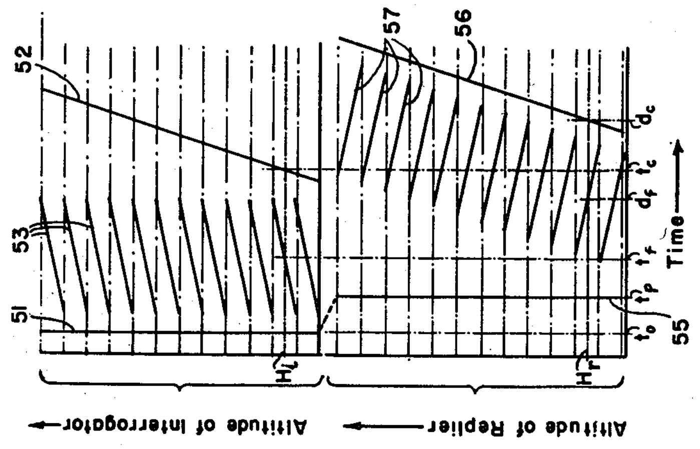
Figure 4:
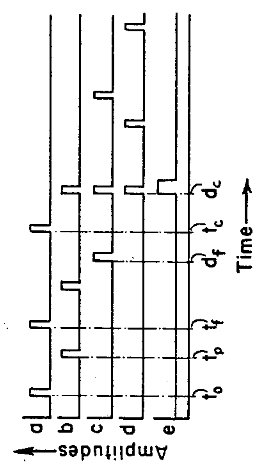
Figure 8:
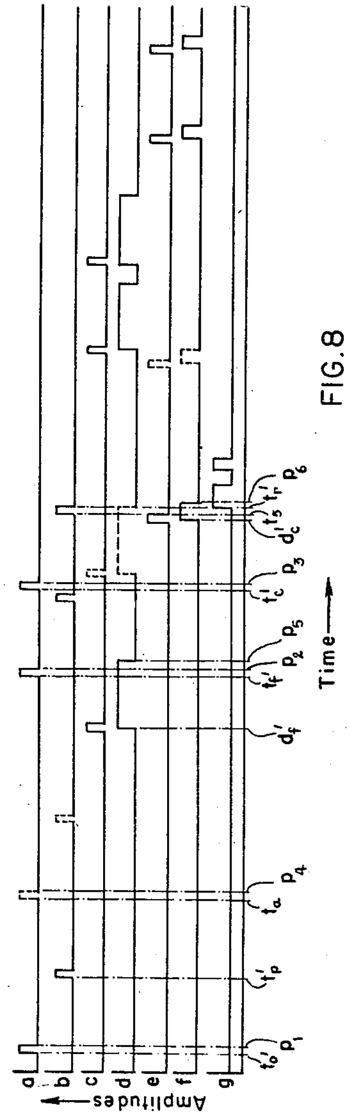
Figure 5:
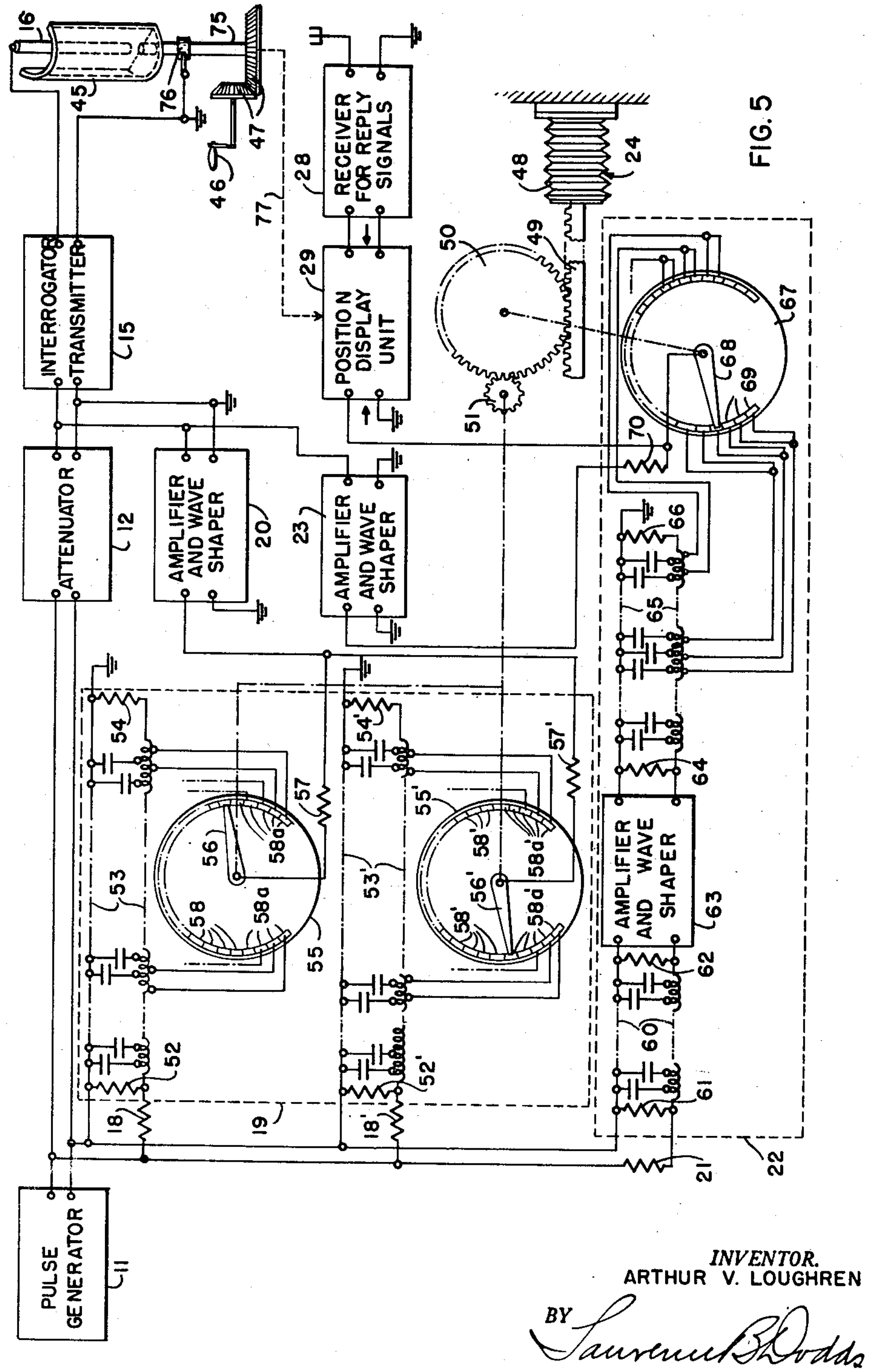
Figure 6:
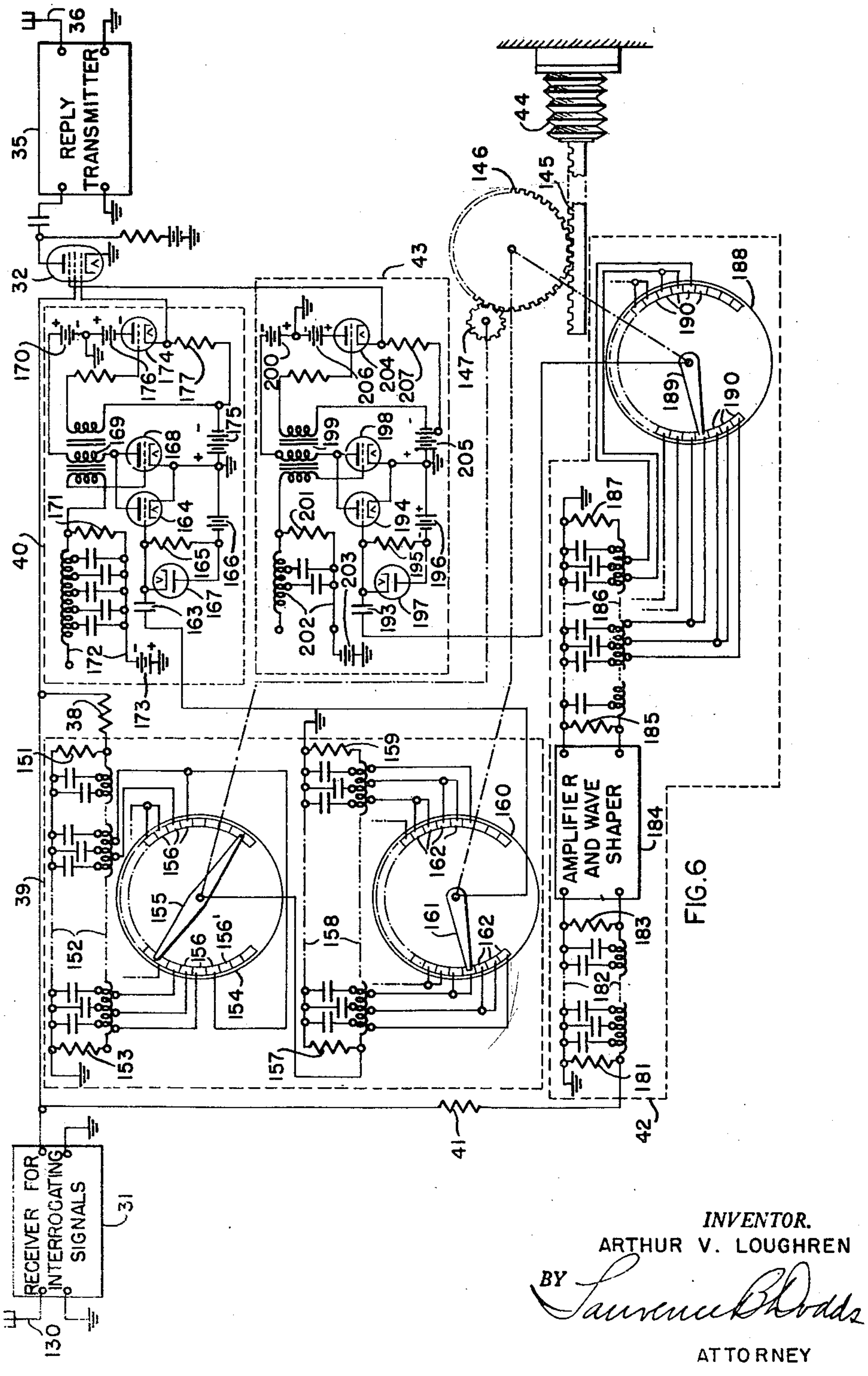

In the drawings, Fig. 1 represents schematically a transmitter for use in a communication system embodying the present invention and Fig. 2 represents schematically a receiver-transmitter arrangement also for use in this system; Fig. 3 graphically depicts certain related signal characteristics which may be obtained using the system of Figs. 1 and 2 and is used as an aid in explaining the system operation; Fig. 4 is a group of graphs having a common time scale and depicting the signals obtained in accordance with the graph of Fig. 3 under one set of conditions; Fig. 5 represents in somewhat greater detail a specific transmitter of the general type shown in Fig. 1; Fig. 6 represents in somewhat greater detail a specific receiver of the type shown generally in Fig. 2; Fig. 7 is a graph corresponding to a portion of the graph of Fig. 3 and depicting in greater detail the operation of the arrangement of Figs. 5 and 6; Fig. 8 is a group of graphs having a common time scale and depicting the signals obtained in accordance with the graph of Fig. 7 under a particular set of operating conditions; and Fig. 9 is a representative display provided by Fig. 1 apparatus.

Referring now more particularly to Fig. 1 of the drawings, there is represented schematically a transmitter suitable for use at one of the stations in a system for communication between two spaced wave-signal stations at least one of which is carried by a mobile object. While the present invention has utility in a wide range of applications, it has particular utility in a system in which one or both of the wave-signal stations is or are carried aboard aircraft and will therefore be described in connection with a particular form of system especially desirable for aircraft navigation and control. In such a system, one of the two spaced stations is an interrogating station for transmitting interrogating signals to the other station, which may be termed a replier or a transpondor station. The transpondor station is adopted to receive the interrogating signals and to transmit reply signals in response thereto. The reply signals are received by a responser arrangement at the interrogating station, the responser utilizing the reply signals to make available to the operator of the interrogator-responser station information obtained from the reply signals concerning the transpondor station.

In one form of the system last mentioned, the interrogating signals serve merely to elicit reply signals from all transpondors within range and to initiate a cycle of operation of the responser arrangement at the interrogator station. In this form of transpondor system the reply signals may be coded to give desired information, such as identity of the transpondor station. However, in the preferred form of system the interrogating signals are coded and only those transpondor stations having suitably adjusted decoder apparatus can transmit reply signals. In this way the number of reply signals may be decreased greatly.

Accordingly, there is represented in Fig. 1 an interrogator-responser station constituting one of the two spaced wave-signal stations required for operation of a communication system of the transpondor type and including an arrangement for transmitting coded interrogating signals. This one station includes a pulse generator 11 having an output circuit coupled to the input circuit of an attenuator and wave shaper 12. Unit 12 has an output circuit coupled to an input circuit of an interrogator transmitter 15, the output circuit of which is coupled to an antenna system 16. The output circuit of pulse generator 11 also is coupled through an isolating resistor 18 to a fine pulse-timing circuit 19, the latter in turn being coupled to an amplifier and wave shaper 20. The output circuit of unit 20 is connected to an input circuit of interrogator transmitter 15. The output circuit of pulse generator 11 further is coupled through an isolating resistor 21 to a coarse pulse-timing circuit 22 having an output circuit connected to an amplifier and wave shaper 23. Unit 23 has an output circuit coupled to an input circuit of interrogator transmitter 15.

The interrogator station also includes a barometric device 24. This device is responsive to the ambient atmospheric pressure at the interrogating station and is coupled mechanically to the fine pulse-timing circuit 19 and to the coarse pulse-timing circuit 22 to control the operation of these units. Units 18—24 provide a signal-coding arrangement. There also is provided a responser arrangement, comprising a receiver 28, located at the interrogating station and adapted to receive reply wave signals. The receiver 28 is coupled to a suitable receiving antenna and has an output circuit coupled to a position-display unit 29 for utilizing reply wave signals to provide an indication of the position of the replying or transpondor station. Unit 29 has an additional input or control circuit connected to the output circuit of the coarse pulse-timing circuit 22.

Before considering the operation of the interrogator-responser station shown in Fig. 1, the transpondor arrangement at the other station of the system will be considered. Referring to Fig. 2, a transpondor station is schematically represented as including means for intercepting wave-signal energy radiated by the interrogator transmitter and for deriving the modulation components of this wave-signal energy. This means includes an antenna system 30 and an interrogating-signal receiver 31. The receiver 31 has an output circuit coupled to one of the input circuits of a mixer 32. Unit 32 in turn is coupled to a reply transmitter 35, which has an antenna 36. Mixer 32, transmitter 35 and antenna 36 form means coupled to the receiver 31 for utilizing, under certain conditions to be discussed in detail hereinbelow, the signals derived in receiver 31 from the intercepted interrogating signals.

The transpondor station also includes two time-delay means. One of these means, which is coupled to the output circuit of the receiver 31 through an isolating resistor 38, comprises a fine pulse-delay circuit 39 having an output circuit coupled to the input circuit of a pulse generator and amplifier 40. The output circuit of unit 40 is coupled to a second input circuit of the mixer 32. The other of the time-delay means, which also is coupled to the output circuit of receiver 31 through an isolating resistor 41, comprises a coarse pulse-delay circuit 42 having an output circuit coupled to the input circuit of a pulse generator and amplifier 43. The output circuit of unit 43 is coupled to a third input circuit of the mixer 32. An altitude-responsive barometric device 44, which is responsive to the ambient atmospheric pressure at the transpondor station, is coupled mechanically to the fine pulse-delay circuit 39 and to the coarse pulse-delay circuit 42 to control the operation of these units.

Describing generally the operation of the complete communication system of Figs. 1 and 2, pulse generator 11 of the interrogating transmitter generates a series of short pulses at a repetition frequency which may be determined in the generator 11 itself. The rectangular wave shape of these pulses is improved by unit 12 which employs well-known wave-shaping circuits, and the pulses may be attenuated somewhat if this is found desirable for a reason to be mentioned hereinbelow. The resulting attenuated and shaped pulses modulate a radio-frequency signal generated in unit 15, and the modulated signal is radiated from antenna system 16. This radiated signal is intercepted at the antenna 30 of the transpondor and the pulse-modulation components thereof are derived in the receiver 31. If these pulse signals are accepted by the mixer 32 in a manner more fully to be explained presently, this unit translates a trigger pulse or pulses for modulating a reply wave signal generated in the transmitter 35. This transmitter radiates the modulated signal from antenna 36, and it is received by the responser receiver 28 of the Fig. 1 arrangement. After demodulation in unit 28, the reply signals are applied to position-display unit 29 where they are effective in conjunction with interrogating pulses supplied directly to unit 29 from the timing circuit 22 to indicate the position or identity, or both, of the transpondor station.

For a more detailed description of the operation of the transpondor system of Figs. 1 and 2, reference is had to the graph of Fig. 3. The communication system represented in Figs. 1 and 2 is one in which the interrogator station or the transpondor station, or both, is carried by a mobile object which travels into or through numerous traffic zones into which the space available to mobile objects is divided according to a prearranged plan. In one specific system, at least one of the interrogator and transpondor stations is aboard an aircraft and, for purposes of aircraft navigation and control, altitude traffic zones are established under the control of barometric devices. The response of the barometric devices is directly proportional to altitude, and all are preferably calibrated, preset and sealed at the factory so that all of the barometric devices within a reasonably large area read alike at a given altitude without regard to the specific value of barometic pressure existing at that altitude at a given time. Traffic may then be controlled in accordance with the "pressure altitudes" indicated by the barometric devices.

In dividing the air space available to aircraft into altitude divisions having upper and lower altitude limits, in conformity with the present invention, the total altitude range to be covered is first divided into a plurality of rather large divisions referred to herein as altitude traffic sectors. Since these divisions or sectors are too large for adequate control of large numbers of aircraft, each sector is subdivided into a plurality of altitude traffic zones.

In the following description of the system operation, it will be assumed that both the interrogating station and the responser station are carried by individual aircraft since that is a type of system which permits a description of one rather flexible mode of operation involved. Referring now more particularly to the graph of Fig. 3, the times of occurrence of the various signals produced by the arrangements of Figs. 1 and 2 are indicated on the axis of abscissae. The upper half of the graph has an axis of ordinates scale representing the altitude of the interrogator station of Fig. 1, the top of the graph corresponding to the highest altitude covered by the system. The lowest altitude of the interrogator which is indicated on the graph corresponds to an atmospheric pressure somewhat greater than standard sea level pressure in order to provide a safety margin with regard to atmospheric pressure disturbances.

The time of occurrence of the pulses generated in the pulse generator 11 does not vary with any altitude control and thus may be represented as occurring at time $t_0$ for all altitudes as indicated in Fig. 3 by the line 51. It will be understood that the pulse generator 11 of the interrogator station generates a signal of repeated pulse wave form and, therefore, that subsequent pulses produced by the generator 11 may also be assigned the time $t_0$ since each interrogating and response cycle of the transpondor system is repeated at the repetition rate of pulse generator 11. A pulse occurring at time $t_0$ is applied not only directly to wave shaper 12 but also through isolating resistor 18 to the fine pulse-timing circuit 19, in which the pulse is subjected to a time delay the value of which is under control of the barometric device 24. The delayed pulse is amplified and shaped in unit 20 to obtain a pulse of a uniform amplitude and wave shape without regard to any attenuation and degradation of wave form which the timing circuit may cause. Similarly, the same pulse also is applied through isolating resistor 21 to the coarse pulse-timing circuit 22, in which the pulse is subjected to a different value of time delay also under the control of the barometric device 24. This delayed pulse likewise is amplified and shaped in unit 23 to obtain another delayed pulse having the same amplitude and wave shape as the pulse obtained from unit 20. The attenuator and wave shaper 12 preferably is adjusted so that the undelayed pulse from generator 11 has the same amplitude, duration and wave shape as the delayed pulses obtained from units 20 and 23, attenuation in unit 12 being desirable if sufficient amplification is not effected in units 20 and 23. Pulses from the three units 12, 20 and 23 are applied at different times to modulate the wave signal generated in the transmitter 15 and radiated from the antenna 16. This transmittted wave signal thus has a first modulation characteristic comprising two pulse portions, one occurring for any altitude at a constant time $t_0$ as indicated by line 51 and the other having a time displacement from the time $t_0$ which varies with altitude as indicated by the time of occurrence line 52. This time displacement or separation of the interrogation pulses is variable under the control of the pressure-responsive device 24 and thus has a value dependent during any given operating period upon the altitude of the interrogator. The altitude range accommodated by the system is divided into a group of predesignated traffic sectors having boundaries indicated by the light horizontal lines in the upper half of the graph of Fig. 3. Thus, specific ranges of time separations of the two pulse portions last mentioned, such separation for any given altitude being represented by the horizontal distance from line 51 to a point on the line 52, designate individual ones of the plurality of predesignated altitude sectors. The time separation may be relatively small or large, as indicated by the distances between lines 51 and 52 at the respective bottom and top portions thereof, so that the first modulation characteristic earlier mentioned is variable over a given range of operating values or time separations to designate by the values thereof specific ones of the plurality of traffic sectors available to mobile objects.

Each specific altitude traffic sector may if desired be designated by a single value of time separation, as by using a barometric device which operates in steps when altitude sector boundaries are crossed. However, it may, on the other hand, be more convenient to designate each traffic sector by specific time separations within a rather small range of separations, and this is the type of operation indicated by the slope of line 52 within each altitude sector. Of course, it may be convenient in practice to cover the small range of time separations individual to each sector in several small steps rather than as a continuous variation with change in altitude, but the accuracy of designation of the altitude zones or sectors is increased if the delay of the coarse pulse-timing circuit need not change abruptly as the boundary of an altitude sector is crossed. The delayed pulse produced with any of the time separations indicated by line 52 is obtained from units 22 and 23 and is referred to as having coarse timing because the specific traffic zone occupied by the interrogator is only roughly or coarsely indicated by the sector designation.

A second modulation characteristic of the wave signal transmitted by the interrogator comprises the first of the two pulse portions last described (and represented by line 51) and another or third pulse portion which has a spacing from the first pulse portion at time $t_0$ varying with altitude within each altitude sector as represented by one of the sloping lines 53 in the upper half of the graph of Fig. 3. These two pulse portions thus occur with a time separation at any given altitude zone within a given sector as represented by the horizontal distance between line 51 and a point on one of the lines 53 corresponding to the altitude of the interrogator. This time separation is variable under the control of the pressure-responsive device 24 to designate a specific traffic zone located primarily within the traffic sector designated by the first modulation characteristic. As demonstrated by the graph, a specific time separation of the two pulses last mentioned may designate the same (i. e., the fourth) altitude traffic zones in each sector so that the complete designation of a particular one of the numerous zones depends upon which sector is designated concurrently with the zone designation. Again, as with the first or sector modulation characteristic, it is not necessary that the time separation of the pulses of the zone modulation characteristic vary smoothly with changes in altitude. The separation may change in small steps, the altitude difference required to change from one step to the next determining the altitude sensitivity of the system. The delayed pulse produced at a time varying with altitude as indicated by one of the lines 53 is obtained from units 19 and 20 and is referred to as a fine pulse because it affords a closer or finer designation of the altitude of the transmitter than does the timing of the coarse pulse alone. Thus, the second modulation characteristic is variable over a given range of operating values, specifically the range of time separations between line 51 and the lines 53 in Fig. 3, for designating by the values thereof specific traffic zones located primarily within a specific traffic sector designated by the first modulation characteristic.

To illustrate by a particular example the modulation characteristics of the transmitted wave signal, let it be assumed that the altitude of the interrogator is $H_1$, indicated in Fig. 3 by a horizontal dot-dash line. The first or reference pulse transmitted by the interrogator occurs at time $t_0$, as mentioned above. The coarse pulse, variable in time relative to the reference pulse in accordance with the altitude sector, occurs at time $t_c$. Hence, the reference and coarse pulses have a specific time separation $t_0-t_c$ which designates a specific traffic sector occupied by the interrogator. A fine pulse occurs at time $t_f$ and has with relation to the reference pulse a specific time separation $t_0-t_f$ which designates the specific traffic zone occupied by the interrogator. The modulation-signal pulses thus applied to interrogator transmitter 15, when the interrogating station is at the altitude $H_1$ of Fig. 3, are represented graphically at *a* in Fig. 4. These pulses, obtained from units 12, 20 and 23 are depicted as having equal amplitudes and as having equal short durations.

The transmitted wave signal, modulated in accordance with the pulses depicted at *a* in Fig. 4, propagates through space to the antenna 30 of the transpondor receiver 31, which derives therefrom first, second and third successive pulses, these being the three pulses having the two time separations $t_0-t_c$ and $t_0-t_f$. These three pulses may be respectively referred to as the first, intermediate and last pulses in the train of pulses with which the wave signal is modulated. In the described arrangement, the intermediate pulse of each group is the fine pulse and the last pulse is the coarse pulse. The first or reference pulse of each group thereof is intercepted by antenna 30 at a time $t_p$, indicated at *b* in Fig. 4, determined by the time of propagation $t_0-t_p$ between the two stations. Referring now to the lower half of the graph of Fig. 3, the transpondor characteristics are here illustrated in similar fashion to the interrogator characteristics shown in the upper half of the graph. The time of interception of the first or reference pulse at time $t_p$ is indicated by line 55 and constitutes for the receiver a reference time which is the same regardless of the particular relative altitudes of the interrogator and of the transpondor. The pulses derived by the receiver 31 are applied directly therefrom to an input circuit of the mixer 32.

The coarse pulse-delay circuit 42 with its associated pulse generator and amplifier 43 and the fine pulse-delay circuit 39 with its associated pulse generator and amplifier 40 have respectively longer and shorter time delays for obtaining from the derived pulses respectively long delayed and short delayed pulses of predetermined durations. The two time-delay means 42, 43 and 39, 40 translate with suitable time delays the pulses applied thereto from the receiver 31. As illustrated in Fig. 3, the total range of altitudes available to interrogator and transpondor is the same, and the lower half of the graph is divided by light horizontal lines into the same predesignated altitude sectors shown in the upper half. The delay introduced by the coarse pulse-delay circuit 42 under the control of barometric device 44 is indicated for this altitude range by the line 56, and is seen to differ according to the altitude sector occupied by the transpondor much in the same manner and by the same range of values at any altitude sector as does the corresponding delay of the interrogator. The delay introduced by the fine pulse-delay circuit 39, under the control of the device 44, is indicated for each altitude sector by a line 57 and it will be seen that the value of this delay decreases with altitude through a sector but increases with altitude from one sector to another. The reasons for this manner of delay variation will become more fully apparent hereinafter.

If it be assumed that the transpondor station is situated at an altitude $H_r$, indicated by the dot-dash line in Fig. 3, it will be apparent that the reference pulse received at the transpondor at time $t_p$ emerges from the coarse pulse-delay circuit 42 and amplifier 43 at a delayed time $d_c$ after being subjected therein to a rather large time delay $t_p-d_c$, this being the longer time delay above mentioned. The reference pulse in addition emerges from fine pulse-delay circuit 39 and amplifier 40 at a time $d_f$ after being subjected to a shorter time delay $t_p-d_f$. Referring to *c* in Fig. 4, there are depicted the three pulses applied from the fine pulse-delay circuit 39 and amplifier 40 to an input circuit of mixer 32 with the shorter delay equal to $t_p-d_f$. Likewise, at *d* in Fig. 4 there are depicted the three pulses applied from the coarse pulse-delay circuit 42 and amplifier 43 to an input circuit of mixer 32 with the longer delay $t_p-d_c$.

The values of the transpondor time delays provided by its units 39 and 42 are related to those provided by the units 19 and 22 of the interrogator, the relationship being established on an initial premise that the transpondor and interrogator are at the same altitude. For this condition, the longer time delay $t_p-d_c$ and the shorter time delay $t_p-d_f$ under control of the transpondor barometric device 44 have such relative values that the longer delay corresponds to and is equal to the longer time separation $t_0-t_c$ provided at the interrogator and the shorter delay corresponds to and is equal to the time difference $t_f-t_c$ between the spacings of the coarse and fine pulses of the interrogator. It is this manner of variation of the shorter delay which causes the delay to decrease with altitude through each sector but to increase with altitude from sector to sector as indicated by the lines 57 of Fig. 3.

As indicated in Fig. 3, the altitudes $H_r$ and $H_i$ of the transpondor and interrogator stations are assumed the same. Hence, the particular altitude zone selected at the transpondor station by barometric device 44 is the same zone designated by the pulse separation coding of the interrogating signal under control of the interrogating-station device 24. The mixer 32, reply transmitter 35 and its antenna 36 at the transpondor station comprise means coupled to the signal-detecting means 30, 31 and to the two time-delay means 39, 40 and 42, 43 for utilizing the pulse signal derived by receiver 31 only when the time delays are such as to place the first pulse of the long delay pulse group represented by *d* of Fig. 4, the second or intermediate pulse of the short delayed pulse group represented by *c* of Fig. 4 and the third or last-derived pulse of the group represented by *b* of Fig. 4 effectively in time coincidence. The time-delay relationships earlier specified ensure this coincidence of pulses whenever the interrogator and transpondor are in the same altitude zone. Thus, as represented graphically at *b*, *c* and *d* in Fig. 4, the three specified pulses are indicated as being in exact time coincidence in conformity with the assumed conditions and therefore are translated by the mixer 32 to actuate the transmitter 35 to transmit a reply wave signal, for example one modulated by a modulation-signal pulse of the type represented by *e* in Fig. 4. It will be apparent from the foregoing description of the system operation that the pulse signals received by the transpondor are utilized only when the received pulses have time separations corresponding to the particular traffic zone then occupied by the transpondor station. This particular traffic zone is at all times automatically designated by the pressure-responsive device 44 at the transpondor.

Operation of the responser arrangement comprising units 28 and 29 of Fig. 1 will be considered briefly, although such an arrangement and its operating principles are now conventional and well understood. At the interrogator-responser station, the last or coarse interrogating pulse is supplied from timing circuit 22 to position-display unit 29 at time $t_c$. This pulse initiates a cycle of operation of the position-display unit 29. If unit 29 includes a conventional cathode-ray display tube, the last-mentioned pulse triggers a sweep circuit which generates a sweep signal used to deflect the cathode-ray beam of the display tube. From the time $t_c$ to the time $d_c$, a period equal to the time of propagation $t_0-t_p$, the last pulse transmitted from antenna 16 propagates to the transpondor, as depicted in *a* and *b* of Fig. 4. Since under the assumed conditions this pulse arrives at the transpondor mixer 32 in time coincidence with delay pulses from amplifiers 40 and 43, the mixer is conditioned for translating the pulse to the modulation circuit of reply transmitter 35. The reply pulse leaves transmitter 35 at time $d_c$, as depicted in *e* of Fig. 4, and arrives at the responser receiver 28 after the same propagation period $t_0-t_p$ has elapsed. The pulse-modulation components of the received wave signal are derived in the receiver 28 and are applied to an intensity-control electrode of the display tube. A visual indication thus appears on the display tube at a time when, under the control of the sweep signal applied to effect deflection of its cathode-ray beam, the latter has been deflected to a position corresponding to the round-trip time of propagation between the stations. Therefore, the position of the visual indication is a measure of the distance between the two stations.

Thus, the coding and decoding arrangements of the system require that the two stations be in the same altitude traffic zone before a reply signal is transmitted by the transpondor to enable the position-display unit 29 to provide a distance indication. Unwanted replies consequently are not received from transpondors in other altitude zones. Of course, either the barometric device 24 or the barometric device 44 may be temporarily adjusted manually to correspond to the correct setting for any specified altitude zone when it is desired either to obtain position information from, or to send reply signals to, aircraft in the specified zone.

Fig. 5 shows more fully the details of certain components employed in an interrogator-responser arrangement of the Fig. 1 type, elements of Fig. 5 which correspond to similar elements of Fig. 1 being designated by the same reference numerals.

The antenna system 16 of the present arrangement is shown as including a reflector 45 which imparts a high directivity to the antenna and is manually movable by a hand crank 46 and gear 47 to orient the directivity as desired. The barometric device 24 includes an aneroid element 48 to the free end of which is fastened a rack 49. The aneroid element is shown in a position corresponding to a low altitude. Rack 49 is positioned operatively with respect to a pinion gear 50, with which a smaller gear 51 also meshes.

The fine pulse-timing circuit 19 includes an input circuit across which is connected a resistor 52 and the input terminals of a time-delay transmission line 53 terminated at its remote end by a resistor 54 having a value of resistance equal to the characteristic impedance of the line 53. The input resistor 52 preferably also has a value of resistance equal to the characteristic impedance of time-delay line 53. The time-delay line 53 may comprise a succession of line sections having lumped series inductors and lumped shunt condensers, or it may comprise a delay line having distributed series inductance and distributed shunt capacitance. The fine pulse-timing circuit 19 also includes a switch mechanism 55 having a rotatable contactor 56 coupled to the input circuit of unit 20 through an isolating output resistor 57. Contactor 56 selectively contacts any of a series of switch segments 58 arranged in a semicircle centered on the axis of rotation of the contactor 56. The segments 58 are insulated from each other by insulating spacers narrower in width than the wiper portion of contactor 56, so that the contactor is always in contact with at least one of the segments. Additional insulated segments $58_a$ also are provided on the switch mechanism 55 extending in both counterclockwise and clockwise directions from the end segments 58 which are positioned on the upper half of the switch. The segments 58 and $58_a$ are connected in a clockwise sequence to successive taps on the delay line 53, the first or most counterclockwise segment $58_a$ being connected to a tap affording a minimum time delay relative to the input end of the delay line and the last or most clockwise segment $58_a$ being connected near the remote end of the delay line.

The fine pulse-timing circuit 19 further includes another delay line and switching arrangement identical in construction to the arrangement just described, corresponding elements of the second arrangement being identified by the same reference numerals primed. The contactor 56' on the switch 55' sweeps segments 180 degrees removed from the segments swept by the contactor 56 of switch 55. Both of the contactors 56 and 56' are rotatably driven in synchronism by means of suitable electrically insulated mechanical couplings to the smaller gear 51, as indicated by dot-dash lines. This second timing circuit is coupled between the units 11 and 20 in the same manner as the first timing circuit.

The coarse pulse-timing circuit 22 likewise includes a delay line 60 having an input circuit coupled to the output circuit of the unit 11 and shunted by a resistor 61. The remote end of the delay line 60 is terminated by a resistor 62 and is coupled to the input circuit of an amplifier and wave shaper 63. The output circuit of the latter has a resistor 64 connected in shunt thereto and is coupled to the input circuit of another delay line 65 terminated by a resistor 66. Each of the resistors 61, 62, 64 and 66 has a value of resistance equal to the characteristic impedance of the delay line for which that resistor forms an end termination. The use of the unit 63 between the delay lines 60 and 65 is desirable for the reason that the total delay desired of the delay circuit 22 is so great that undue attenuation and degradation of the translated pulse wave form might otherwise be experienced. A switch mechanism 67 has a contactor 68 arranged to sweep over circularly positioned insulated segments 69. The segments 69 are connected together in pairs in a clockwise sequence and these pairs are connected to successive taps on delay line 65 with the most counterclockwise pair connected to a point near the input terminal of the line. The rotatable contactor 68 is connected mechanically to the pinion gear 50 but is electrically insulated therefrom. The contactor 68 of switch 67 is connected conductively to a sweep control circuit of position-display unit 29 and also is connected through an isolating output resistor 70 to the input circuit of unit 23.

The rotatable reflector 45 of the antenna system is driven by a shaft 75 having a slip ring and co-operating brush device 76 for grounding the reflector. The beam of the cathode-ray tube of unit 28 is deflected radially to provide distance indications as previously described, but is also deflected in an angular direction corresponding at any time to the particular angular position at that time of the reflector 45. To this end, the shaft 75 has a mechanical coupling 77 to the angular-deflection field element of the position-display unit 29.

Neglecting for the time being the functions of the switch segments $58_a$ and $58_a$' of the respective switches 55 and 55', the operation of the interrogator-responser of Fig. 5 is the same as that of the Fig. 1 arrangement. This operation is represented graphically in amplified form by the upper half of the graph of Fig. 7. This half of the graph corresponds to the lower two altitude sectors of the upper half of the graph of Fig. 3. The predesignated boundaries between these three sectors are indicated by light horizontal lines 120. Using the same altitude and time designations used in connection with Fig. 3 but with a prime notation, pulse generator 11 initiates a series of pulses at a time represented by the vertical line 121 and referred to as time $t_0'$. This pulse passes through wave shaper 12 to modulate the wave signal generated in transmitter 15. It also is applied through isolating resistor 18 to the delay line 53 of the fine pulse-timing circuit 19. After the length of time necessary for it to reach the proper tap on delay line 53, the pulse passes through one of the segments 58 to contactor 56 and thenceforward through isolating output resistor 57 to amplifier and wave shaper 20. Unit 20 serves to amplify and shape the pulse from the timing circuit 19 so that the delayed pulse has an amplitude, duration and wave shape comparable to that of the undelayed reference pulse applied through wave shaper 12 to transmitter 15.

The pulse from generator 11 further is applied through isolating resistor 21 to the delay line 60 of coarse pulse-timing circuit 22 and thenceforward through amplifier and wave shaper 63 to the delay line 65. The total time delay desired in the circuit 22 is so great that undue attenuation and degradation of the pulse might be expected if the amplifier and wave shaper 63 were not inserted between the delay lines 60 and 65. After traveling to the proper tap on the delay line 65, the pulse passes through a switching segment 69 of switch 67 to contactor 68 and onward through isolating output resistor 70 to the amplifier and wave shaper 23. By properly adjusting amplifier and wave shaper 63, and by properly dividing between delay lines 60 and 65 the total time delay required in the timing circuit 22, the amplitudes and shapes of the output pulses from timing circuits 19 and 22 may be made approximately the same.

Referring again to Fig. 7, the pulse translated through coarse pulse-timing circuit 22 and unit 23 arrives at transmitter 15 at a time dependent upon the pressure altitude of the interrogator station. At the low altitude assumed for this station, the contactor 68 of switch 67 contacts one of the most counterclockwise switching segments 69 producing a time interval from the leading edge of the reference pulse to the leading edge of the coarse pulse of rather long duration, yet relatively short compared with the still longer intervals available. This time interval is represented in the graph of Fig. 7 by the horizontal distance, for a given interrogator altitude, from the line 121 to a line 122. Assuming the interrogator altitude to be $H_1'$, represented by the horizontal dot-dash line in Fig. 7, the leading edge of the coarse pulse actuates transmitter 15 at time $t_c'$ after a time interval $t_0'-t_c'$.

Meanwhile, the same generated pulse passes through fine pulse-timing circuit 19 and amplifier 20, and its leading edge reaches transmitter 15 at a time represented by one of the solid lines 123 on the graph of Fig. 7. The solid lines 123 have a discontinuity at each of the sector boundaries 120. At these altitudes one of the two contactors 56 and 56' of switches 55 and 55' leaves the semicircular upper portion of the respective switch while the other of the two contactors enters that portion of its switch. Thus, at an altitude represented by a sector line 120 the pulse obtained from timing circuit 19 may be considered to shift from a segment 58 to a segment 58' or vice versa, this shift being from a segment connected to a tap near the end of delay line 53 to a tap nearer the beginning of delay line 53' or vice versa. The function of the additional taps connected to the switch segments $58_a$ and $58_a'$ will be considered hereinbelow. Therefore, it is apparent that the switch segments 58 and 58' alternately are connected in the fine pulse-timing circuit 19 during the passage of the pressure-sensitive device 48 through alternate altitude sectors. When the interrogator altitude is $H_1'$, one of the segments 58 or 58' causes the fine pulse to occur at a time $t_f'$, depicted in Fig. 7, separated from the reference pulse by a time interval $t_0'-t_f'$.

As the altitude increases the pressure decreases and the aneroid device 48 expands and pushes rack 49 to the left. The resulting rotation of pinion gear 50 causes a clockwise rotation of the coarse pulse contactor 68 of switch 67. The switching segments of switch 67 are shown connected to taps on delay line 65 in pairs, two adjacent segments per tap. As contactor 68 leaves the more clockwise segment of each pair, the time separation between the coarse pulse and the reference pulse increases by one small step. As with the graph of Fig. 3, however, the line 122 in the Fig. 7 graph is conveniently shown as having a constant slope indicating a steady increase in pulse separation with increasing altitude. Nevertheless, as already mentioned, it is often more convenient in practice to effect stepwise increases of the pulse separation. When this is done the line 122 represents with reference to line 121 average changes of pulse separation over a considerable range of altitudes. In one specific embodiment of the Fig. 5 arrangement the contactor 68 covers fourteen segments, or seven pairs of segments, while the altitude changes through a range equal to four predetermined altitude sectors. This corresponds to four-sevenths of an altitude sector for each stepwise increase in coarse pulse separation. It is assumed that the angular position of pinion gear 50 is directly proportional to altitude in feet.

The mechanical coupling from the gear 51 to the contactors 56 and 56' of switches 55 and 55' is such that these two contactors also move clockwise with increase in altitude. As with the coarse pulse, the fine pulse separation from the reference pulse also conveniently may increase in a stepwise manner. In such a case the lines 123 of the graph of Fig 7 indicate average changes in the time separation between the fine and reference pulses. In one embodiment of the Fig. 5 arrangement, there are thirty-five small stepwise changes in this fine pulse separation in each altitude sector thus corresponding to a 10:1 ratio of the gears 50 and 51. Accordingly, the contactors 56 and 56' make one complete revolution every two altitude sectors and may make many revolutions continuously in the same sense if the altitude change is great enough.

Whenever a tap on one of the delay lines 53, 53' or 65 is connected through its corresponding switching segment and contactor to the corresponding output isolating resistors 57, 57' or 70, an impedance discontinuity is introduced at the delay line at that tap. Reflections back to the sending end of the line are not re-reflected down the line because of the impedance-matching input resistors. Moreover, the connection to the tap greatly decreases the amplitude of a pulse traveling beyond the tap, and any such pulse is absorbed without reflection in the terminating resistor. When a contactor is between two segments connected to adjacent taps and in contact with both of these segments, the pulse from the later tap is of such decreased amplitude and comes so soon after the pulse from the first tap that transmitter 15 is unable to respond to the second pulse. Thus, the second tap is not effective while the switch contactor still rests on the switching segment connected to the first tap. Likewise, when the altitude is decreasing, the tap corresponding to the smaller delay is effective as soon as the contactor touches the corresponding segment.

The durations of the interrogating pulses produced by the Fig. 5 arrangement also are indicated in Fig. 7. The reference pulse which starts at a time $t_0'$, as indicated by the line 121, ends at a time $p_1$, as indicated by a line 124. The coarse pulse, starting at a time indicated by line 122, ends at a time $p_3$ indictaed by a line 125. The fine pulse, starting at a time indicated by one of the solid lines 123, ends at a time $p_2$ indicated by the corresponding point on one of a series of lines 126. Thus, when the interrogator altitude is $H_1'$, the fine pulse starting at time $t_f'$ ends at time $p_2$, while the coarse pulse starting at time $t_c'$ ends at time $p_3$. All these interrogating pulses have durations which are substantially the same and equal to the duration $t_0'-p_1$ of the reference pulse.

Fig. 8 is a series of graphs having a common time scale and representing the various pulses produced during operation of the interrogator system of Fig. 5, and the transpondor system of Fig. 6 presently to be described, under a specific set of conditions. The graph indicated at *a* of Fig. 8 illustrates the times of occurrences of the leading and trailing edges of reference, coarse and fine pulses taken from the graph of Fig. 7 for interrogator altitude $H_1'$. Corresponding reference characters designate the times of transmission of the leading and trailing edges of the three pulses just discussed.

Fig. 6 represents suitable circuit arrangements for the several units of the Fig. 2 transpondor, elements in Fig. 6 corresponding to similar elements of Fig. 2 being designated by similar reference numerals. The output circuit of receiver unit 31 is coupled through the isolating resistor 38 to the fine pulse-delay circuit 39, the output circuit of which is coupled to the pulse generator and amplifier 40. The output circuit of unit 40 is connected to the screen electrode of the mixer which is shown as comprised by a pentode type of tube 32. The output circuit of receiver 31 further is connected through the isolating resistor 41 to the coarse pulse-delay circuit 42, the output circuit of which is coupled to the pulse generator and amplifier 43. The output circuit of amplifier 43 is connected to the suppressor electrode of mixer tube 32. The pressure-responsive device 44 comprises an aneroid barometer which is connected mechanically to a rack 145, meshing with pinion gear 146 which in turn meshes with a smaller gear 147. It is preferable that receiver unit 31 include a conventional amplitude limiter so that the pulses applied to the mixer tube 32 and the two delay circuits have a preselected amplitude regardless of wave-propagating conditions between the interrogator and transpondor stations.

The time-delay means of the delay circuits 39 and 42 are illustrated in forms quite similar to the timing circuits 19 and 22 of Fig. 5, and the delay circuits include delay lines and switch mechanisms which may be almost identically the same as those in the timing circuits. Specifically, fine pulse-delay circuit 39 includes an input resistor 151 across the input end of a delay line 152 having a terminating resistor 153. A switch mechanism 154 has a contactor 155 with two wiper arms contacting points 180 degrees apart on the periphery of the switch 154. This switch conveniently may carry a number of segments 156 disposed around its periphery in the same manner as the segments 58 and 58a of the switch 55 in the Fig. 5 arrangement. All the segments are not used, however. Those in the upper half only of the switch are connected to successive delay-line taps in the same way as are the segments 58 of switch 55, except that the greatest time delay is obtained from the tap connected to the most counterclockwise switch segment. To ensure that contactor 155 is always in circuit with delay line 152, the first tap on the delay line 152 is connected not only to the most clockwise switching segment 156 in the upper half of switch 154, but also to another segment 156' located just below the most counterclockwise segment. The contactor 155 is connected mechanically but not electrically to the smaller gear 147 so as to rotate clockwise with increasing altitude at the same rate per unit change of altitude as does the contactor 56 of the switch 55 at the interrogator.

Contactor 155 is connected to an input resistor 157 connected across the input end of another delay line 158 which is terminated by a resistor 159. Associated with this delay line is a switch mechanism 160 having a rotating contactor 161 and switching segments 162. The most counterclockwise segment 162 is connected to the input end of delay line 158, while the other segments 162 are connected together in pairs in a clockwise sequence and the pairs are connected to successive taps on the delay line 158. The contactor 161 is connected to the input circuit of the pulse generator and amplifier 40, and is rotatable in a clockwise sense with increasing altitude by virtue of a mechanical connection to the pinion gear 146.

The pulse generator and amplifier 40 has a coupling condenser 163 which couples the contactor 161 of the switch mechanism 160 to the control electrode of an electron tube 164. The input circuit of tube 164 includes an input resistor 165 connected to its control electrode, and a source of biasing voltage 166 connected between the resistor 165 and ground. The resistor 165 is shunted by a diode electron tube the cathode of which is connected to the control electrode of tube 164. The cathode of tube 164 is grounded. Another triode electron tube 168 has a plate-cathode circuit in shunt with the plate-cathode circuit of tube 164. The anode electrodes of both tubes are connected through a winding of a transformer 169 to a source of space current 170. Tube 168 and transformer 169 are in a blocking oscillator circuit in which the control electrode of tube 168 is connected through another winding of transformer 169 to a resistor 171 coupled across the input end of a delay line 172. The end of resistor 171 remote from tube 168 is grounded through a source of biasing voltage 173. Transformer 169 has an output winding one terminal of which is coupled to a control electrode of a triode electron tube 174 and the other terminal of which is connected to the negative terminal of a source of biasing voltage 175. The anode electrode of tube 174 is connected to a source of space current 176, while the cathode is connected through a cathode resistor 177 to a tap on the source of biasing voltage 175. The cathode of tube 174 also is connected to a control electrode of tube 32, and the positive end of the biasing source 175 is grounded.

The coarse pulse-delay circuit 42 comprises an input resistor 181 across the input end of a delay line 182. This delay line is terminated in a resistor 183 in shunt with the input circuit of an amplifier and wave shaper 184. The output circuit of unit 184 is connected to an input resistor 185 of another delay line 186, terminated in turn by a resistor 187. Associated with delay line 186 is a switching mechanism 188 having a rotatable contactor 189 mechanically coupled to pinion gear 146 for clockwise rotation with increasing altitude. Switch 188 has peripherally arranged switching segments 190, the most counterclockwise of which is connected to a tap on the input end of delay line 186. The other segments 190 are connected in pairs in a clockwise sequence and the pairs are connected to successive taps on delay line 186. Thus, both of the switching mechanisms 160 and 188 are similarly connected to their respective delay lines 158 and 186 and may have contactors similarly mounted on the same shaft. Both mechanisms resemble in construction and operation the switch 67 at the interrogator. The delay lines 65 and 186 may be identically constructed from their first taps to their remote ends.

Contactor 189 of switch 188 is connected to the input circuit of the pulse generator and amplifier 43. Unit 43 is made up of components similar to those of unit 40. Thus its input circuit, following a coupling condenser 193, includes the control electrode of a triode tube 194 connected to ground through a resistor 195 and biasing battery 196. Resistor 195 is shunted by a diode 197. Another triode 198 and the tube 194 have a common anode-cathode circuit, and their anodes are connected through a winding of a transformer 199 to a source of space current 200. Another transformer winding is connected to the control electrode of tube 198 and, through a resistor 201 in shunt with the input end of a delay line 202, to a biasing battery 203 and ground. An output winding of transformer 199 is coupled to a control electrode of a triode tube 204 and to a source of biasing potential 205. Tube 204 has a source of space current 206 and a cathode resistor 207 grounded through a tap on battery 205. The cathode of tube 204 also is connected to the suppressor electrode of mixer tube 32. The delay lines 172 and 202 of units 40 and 43, respectively, are open-circuited at their remote ends, and usually introduce different amounts of delay.

The operation of the transponder station illustrated in Fig. 6 will be considered with reference to the graphs of Figs. 7 and 8. The lower half of the graph of Fig. 7 represents the pulse-translation characteristics of the transpondor as functions of time and the altitude of the transpondor. As with the upper half of the graph, only the two lowest altitude sectors and a portion of the third lowest sector are illustrated and the boundaries between the sectors are indicated by light lines 120. A line 215 represents the time of interception of the leading edge of the reference pulse as received by the transpondor from the interrogator station. This time is designated $t_p'$, giving a time of propagation between the stations equal to $t_0'-t_p'$. The intercepted pulses are illustrated at *b* in Fig. 8, starting as the time $t_p'$. As intercepted, their durations are the same as when transmitted but their amplitudes are determined by the limiting level imposed in receiver unit 31. In the absence of these pulses the screen electrode of mixer tube 32 is at ground potential, and the tube can conduct no appreciable space current regardless of the voltages present on the control and suppressor electrodes.

The intercepted pulses also pass through the fine pulse-delay circuit 39 and appear with positive polarity at the input circuit of unit 40, as illustrated in *c* of Fig. 8. Although these pulses may be subject to some attenuation and deterioration of their wave form in the delay circuits 152 and 158, they still have sufficient amplitudes to overcome the bias of battery 166 and render tube 164 conductive. The resulting space current is supplied to tube 164 from battery 170 through the anode winding of transformer 169. As tube 164 starts to conduct, the current through the anode winding induces a voltage impulse on the winding which is connected to the control electrode of tube 168. The latter winding is connected to this control electrode and to delay line 172 in such a sense that the voltage impulse is applied to the control electrode with positive polarity to cause control-electrode current to flow. The control-electrode current produces across the resistor 171 a potential pulse which is applied to the delay line 172 with negative polarity. As a result, tube 168 also commences to draw space current through the anode winding of transformer 169. This space current continues to increase at a rate sufficient to cause a continuing positive voltage to be induced in the winding connected to the control electrode of tube 168 even after the pulse applied to tube 164 ceases. When the applied pulse ceases, coupling condenser 163 may be left with a negative charge but this charge is quickly dissipated through diode 167 to prepare circuit 40 for the next positive pulse. Meanwhile, the leading edge of the negative voltage impulse applied to delay line 172 travels down this line to the open end thereof, where it is reflected without change in polarity, and travels back to the input end of the line. At that time the reflected voltage impulse is applied with negative polarity to the control electrode of tube 168 and causes the latter to stop conducting. Thus, a voltage is induced in the output winding of transformer 169 for a period of time commencing with the application of a delayed pulse to the control electrode of tube 164 and ending when the reflected pulse returns to the input end of delay line 172. This voltage is applied during this period with positive polarity to the control electrode of tube 174 to overcome the bias of battery 175. Hence a pulse of the same duration is developed with positive polarity across the cathode load resistor 177 and is applied to the control electrode of mixer tube 32 to overcome the bias supplied thereto from the tap of battery 175.

Each of the delayed pulses of *c* in Fig. 8 is applied to the input circuit of the pulse generator and amplifier 40 and the leading edge of each triggers the blocking oscillator 168 into a conductive condition to cause the generation of the longer pulses depicted in $d$ of Fig. 8, which are applied to the control electrode of mixer tube 32. It may be noted that these longer pulses have equal durations since their durations are determined by the length of delay provided by the delay line 172.

The intercepted pulses are also applied from the receiver unit 31 to the coarse pulse-delay circuit 42. In this circuit they are delayed in delay line 182 and then applied to amplifier and wave shaper 184 to compensate for attenuation and degradation of the wave shape occurring in delay line 182. The amplified pulses pass along delay line 186 to the tap selected by switch 188 and then pass from contactor 189 to the input circuit of pulse generator and amplifier 43. The latter operates in a manner exactly analogous to the operation of the pulse generator and amplifier 40. However, the output pulses from unit 43 are of shorter duration than those from unit 40 due to the use of a delay line 202 in the blocking oscillator of unit 43 having a relatively short time delay. The resulting pulses are applied from cathode load resistor 207 of tube 204 to the suppressor electrode of mixer 32 to overcome the negative bias supplied to this electrode from the tap on battery 205. If at the same time a signal is applied from circuit 40 to overcome the bias applied to the control electrode and a pulse from the output circuit of the receiver unit 31 simultaneously provides a suitable voltage at the screen electrode, tube 32 is conditioned to conduct space current. The delayed pulses applied from coarse pulse-delay circuit 42 to pulse generator and amplifier 43 are illustrated in the graph $e$ of Fig. 8, and the corresponding pulses applied from unit 43 to mixer tube 32 are illustrated in $f$ of Fig. 8.

Referring again to the lower half of the graph of Fig. 7, line 216 represents the start of the reference pulse applied to the mixer tube after passage through coarse pulse-delay circuit 42 and triggering of the pulse generator and amplifier 43. Thus, the time delay from the start of the intercepted reference pulse to the start of the delayed reference pulse applied to the suppressor electrode of the mixer tube is represented by the horizontal distance, for a given altitude of the transpondor, between the lines 215 and 216. Assuming that the replier has a pressure altitude $H_r'$ near the lower boundary of the second lowest altitude sector, this delayed pulse starts at a time $d_c'$ after a delay $t_p'-d_c'$ from the start of the intercepted reference pulse. The time $d_c'$ also is noted in $f$ of Fig. 8, where it is seen to be the time of starting of the reference pulse after delay in coarse pulse-delay circuit 42, as shown in $e$ of Fig. 8, plus a very small additional delay required to trigger into operation the blocking oscillator circuit of unit 43. All the intercepted pulses are delayed in unit 42 and cause corresponding pulses of extended duration to be generated in unit 43 and applied to the mixer tube 32.

Meanwhile, the pulses delayed in the fine pulse-delay circuit 39 cause a delayed and extended reference pulse to be applied from pulse generator and amplifier 40 to mixer tube 32 starting at a time represented by one of the lines 217 in Fig. 7. This delayed reference pulse is followed by other pulses corresponding to the other intercepted pulses and equally delayed and extended in duration. When the altitude of the replier is $H_r'$, the delayed reference pulse applied to the control electrode of mixer tube 32 from unit 40 starts at the time $d_f'$, as illustrated in Fig. 7 and in graph $d$ of Fig. 8.

The duration of the pulses applied to mixer tube 32 after the long or coarse delay is indicated by the horizontal separation between line 216 and line 218 in Fig. 7, while the duration of the pulses applied to the mixer tube after the shorter or fine delay is indicated by the horizontal separation between one of the pairs of lines 217, 219. Thus, at replier altitude $H_r'$, the reference pulse after suffering the fine delay to a starting time $d_f'$ ends at a time $p_5$ with a pulse duration $d_f'-p_5$ determined by delay line 172. Likewise, the reference pulse after suffering the coarse delay to a starting time $d_c'$ ends at a time $p_6$ with a pulse duration $d_c'-p_6$ determined by the delay line 202. The times $p_5$ and $p_6$ also are indicated in connection with the representations of the delayed reference pulses in graphs $d$ and $f$, respectively, of Fig. 8.

As previously explained in connection with the systems of Figs. 1 and 2, the transpondor mixer 32 utilizes the pulses of the intercepted composite signal provided there are applied to the three input circuits of the mixer three pulses effectively in time coincidence. The intercepted pulses of the composite signal are applied directly from the receiver unit 31 to the screen electrode of tube 32. After a longer or coarse delay, the intercepted pulses are applied to the suppressor electrode of the mixer tube. This delays the first or reference pulse by an amount sufficient to make it coincide with the last pulse applied to the screen electrode, provided the intercepted pulses are coded for the altitude sector selected at the transpondor. Hence, the transpondor has a long time delay which provides a first selective or decoding characteristic determining the particular one of the predesignated series of broad altitude sectors. After a shorter or fine delay, the intercepted pulses are applied to the control electrode of tube 32. This delays the intermediate or fine pulse by an amount sufficient to make it coincide with the last pulse applied to the screen electrode, provided the intercepted pulses are coded for the altitude zone selected at the transpondor. Hence, the transpondor also has a shorter time delay which provides a second selective characteristic fixing the altitude zonal position of the transpondor within the particular altitude sector selected at the transpondor. Since in this case the fine pulse is delayed into coincidence with the coarse pulse, the coarse pulse timing also must be taken into account in setting the fine delay; this is accomplished in the Fig. 6 arrangement by adding an increment of delay from delay line 158 to the delay of delay line 152. The addition of the delay of delay line 158 causes the zone decoding characteristic limits to vary from sector to sector.

The transpondor itself also provides utilization of the received composite signal whenever the interrogator and transpondor stations are within a predetermined altitude tolerance even though one of them is slightly within one of the sectors and the other is slightly within an adjacent sector. The two delay lines 172 and 202, in establishing the pulse duration of the delayed pulses applied from the units 40 and 43 to the mixer tube 32, determine this separation tolerance.

The interrogator preferably provides an additional amount of altitude separation tolerance at the boundary of two adjacent zone sectors. To this end, an additional intermediate or fine pulse is included in the composite interrogator signal whenever the principal fine pulse represented in Fig. 7 by a solid line 123 occurs at a time approaching one of the sector limits. The starting time of the additional fine pulse is represented in Fig. 7 by a portion of one of a group of dotted lines 223, which are extensions of the solid lines 123 in both directions. The lowest line 123 is not extended in the direction representing lower altitudes because the lower end of that line corresponds to the lowest altitude accommodated by the system. The extents of the dotted extensions 223 are determined by the predetermined altitude tolerance of the transpondor system, and hence are related to the duration of the short delayed pulses obtained at the transpondor. Now the last-mentioned duration represents double the desired altitude tolerance to take into account transpondor altitudes both greater and less than the interrogator altitude plus a small increment of duration to assure coincidence for a period long enough to actuate the mixer unit. Accordingly, each dotted extension 223 extends far enough to represent a timing change equal to slightly less than one-half of the duration of the short delayed pulses of the transpondor. To demonstrate the function of the auxiliary fine pulse, reference again is had to Fig. 7. The altitude sector appropriate to the interrogator altitude $H_I'$ is the lowest or first sector. For interrogator altitude $H_I'$ the principal fine pulse starts at time $t_I'$, as determined from the solid line 123 for the first sector. The starting time of the auxiliary fine pulse is $t_a$, as determined from the dotted line 223 which is an extension into the first sector of the line 123 for the second sector. The second sector is the particular sector occupied by the replier at altitude $H_r'$. Thus the last-mentioned dotted line 223 represents variations of the auxiliary fine pulse beyond the predetermined lower limit of the last-mentioned line 123. The auxiliary fine pulse conveniently has the same duration as that of the other interrogator pulses. Accordingly, in Fig. 7 the auxiliary pulse which starts at a time $t_a$, as indicated by a dotted line 223, ends at a time $p_4$ as indicated by a dotted line 226. This and the other dotted lines 226 are extensions of the solid lines 126. The auxiliary fine pulse starting at time $t_a$ and ending at time $p_4$ appears in broken lines in graph *a* of Fig. 8 along with the reference pulse, principal fine pulse and coarse pulse. If all four pulses, including the first or reference pulse, the two intermediate or fine pulses and the last or coarse pulse, are intercepted at the transpondor, they all give rise to the corresponding short delayed and long delayed pulses as depicted by both the broken-line and solid-line curves of graphs *b*–*f*, inclusive, of Fig. 8.

The auxiliary fine pulse is obtained in the interrogator arrangement of Fig. 5 from the same pulse-timing circuit 19 which supplies the principal fine pulse, but more particularly from the extreme taps on delay lines 53 and 53' connected to the switch segments $58_a$ and $58_a'$ respectively. These segments are located on the switches 55 and 55' adjacent the segments 58 and 58' for the principal fine pulses. It is evident from an inspection of the delay-line taps, switch segments and switch contactors 56 and 56' that the timing of the principal and auxiliary fine pulses corresponds in general to the timing depicted by the lines 123 and dotted extensions 223 in the graph of Fig. 7. It will be apparent that the arrangement of Fig. 5 provides fine stepwise timing intervals for the auxiliary fine pulse near each end of an altitude sector.

Referring again to Fig. 8, it is of interest to examine the intercepted pulses, short delayed pulses and long delayed pulses of *b*, *d* and *f*, respectively, to ascertain the manner in which pulses are applied simultaneously to the three input electrodes of mixer tube 32 so as to actuate the reply transmitter 35. The last or coarse pulse as intercepted starts at the time $t_5$ and ends at the time $t_r'$, as appears from *b* in Fig. 8. After subjection to the long or coarse delay, the first or reference pulse produces a pulse depicted in *f* of Fig. 8 between the times $d_c'$ and $p_6$, a duration encompassing the duration of the last intercepted pulse. Graph *d* of Fig. 8 indicates, however, that the principal fine pulse (the second pulse from the right in *d* of Fig. 8) after subjection to the short or fine delay occurs substantially later than the time $t_r'$ so that the transpondor would not respond to this pulse spacing to transmit a reply wave-signal pulse since the pulse spacing is that occurring when the interrogator and transpondor are in different altitude sectors. The presence of an auxiliary fine pulse in the interrogator pulse coding indicates, however, that the interrogator is near the boundary of two adjacent sectors. If the interrogator is in one and the transpondor is in the other of these adjacent sectors, the auxiliary fine pulse after delay in the fine pulse-delay circuit starts some time before the time $t_5$ and ends at the time $t_r'$, so that it encompasses the duration of the last intercepted pulse. Consequently, signals are applied to all three input electrodes of the mixer tube 32 coincidentally starting at time $t_5$ and ending at $t_r'$. Assuming the duration of coincidence necessary to actuate reply transmitter 35 is $t_5-t_r'$, the reply signal commences at time $t_r'$. Such a reply signal is depicted in *g* of Fig. 8. It may be noted that even a slightly greater altitude separation of the two stations would prevent the transpondor from operating since with a slightly lower interrogator altitude the short delayed auxiliary fine pulse, which as depicted in *d* of Fig. 8 lasts just long enough to permit actuation of transmitter 35, would start even sooner and would end too soon for sufficient coincidence with the other two pulses in mixer 32. Thus the duration of the short delayed pulses determines the altitude tolerance of the system by determining the extent of the particular altitude zone selectable at the transpondor.

By obtaining coincidence in mixer 32, the transpondor has been conditioned for transmitting a reply wave signal in response to a suitable received composite signal. The reply wave signal may be given identifying characteristics by suitable means (not shown) provided in the reply transmitter 35; for example, the transmitted reply wave signal may be modulated in accordance with the Morse character N as depicted in *g* of Fig. 8 to identify the transpondor.

Fig. 9 represents the type of display which may be produced by the position-delay unit 29 of Fig. 1. It will be noted that the display includes two pulses corresponding to the Morse character N which identifies the transpondor station of Fig. 2. The distance from the left hand or starting point of the sweep to the leading edge of the first or broad pulse denotes the distance between the interrogator-responser station of Fig. 1 and the transpondor station of Fig. 2. The screen of the display unit 29 preferably carries a suitable scale to indicate distance. Thus the display unit 28 is effective to indicate both the position and the identity of the transpondor station.

It will be apparent from the foregoing description of the invention that a communication system embodying the invention is able, by means of easily controlled pulse coding, accurately and consistently to communicate selectively with any of a very large number of communication channels. The communication system of the invention has the additional advantage that it enables a substantial simplification and reduction of cost of the equipment necessary to effect such selective communication as compared with other systems heretofore proposed for this purpose. Additionally, the communication system of the invention is characterized by such high accuracy and reliability of operation as to render it particularly suitable for aircraft navigation and traffic control applications.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for communication between two spaced wave-signal stations at least one of which is carried by a mobile object comprising, means at one of said stations for transmitting wave-signal energy having a first modulation characteristic including two pulse wave form portions with a variable time separation for designating by the values of the time separations thereof individual ones of a plurality of traffic sectors available to mobile objects and having a second modulation characteristic including one of said two pulse wave form portions and including another pulse wave form portion with a variable time separation designating by the values of the time separations thereof individual ones of a plurality of traffic zones located primarily within each of the traffic sectors individually designated by said first characteristic, means at the other of said stations for intercepting said wave-signal energy and for deriving therefrom signal energy including three pulse wave form portions having said two time separations, and means at said other station for utilizing said derived signal energy only when the time separations of the pulse wave form portions thereof correspond to a particular traffic sector and zone selectable at said other station.

2. A system for communication between two spaced wave-signal stations at least one of which is carried by a mobile object comprising, means at one of said stations for transmitting wave-signal energy modulated by a signal of pulse wave form having a separation between a first pair of pulses thereof of controllable value designating individual ones of a plurality of traffic sectors available to mobile objects and having a separation between another pair of pulses thereof designating by individual ones of a plurality of traffic zones located primarily within each of the traffic sectors individually designated by said first pair of signal pulses, means at the other of said stations for intercepting said wave-signal energy and for deriving therefrom first, intermediate, and last pulses having said two time separations between pairs of pulses thereof, two time-delay means having longer and shorter time delays respectively for obtaining from said derived pulses respectively long delayed and short delayed pulses, and means coupled to said intercepting means and to said two time-delay means for utilizing said derived pulses only when the first long delayed pulse, the intermediate short delayed pulse, and the last derived pulse are effectively in time coincidence, said longer and shorter time delays being selected so that said longer delay corresponds to the longer of said two time separations and said shorter delay corresponds to the time difference between said two time separations when said time separations designate a particular traffic sector and zone selectable at said other station.

3. In a system for communication between two spaced wave-signal stations at least one of which is carried by a mobile object, a wave-signal receiver comprising, means for intercepting wave-signal energy having a first modulation characteristic including two pulse wave form portions with a variable time separation for designating by the values of the time separations thereof individual ones of a plurality of traffic sectors available to mobile objects and having a second modulation characteristic including one of said two pulse wave form portions and including another pulse wave form portion with a variable time separation designating by the values of the separations thereof individual ones of a plurality of traffic zones located primarily within each of the traffic sectors individually designated by said first characteristic, means for deriving from said intercepted wave-signal energy including three pulse wave form portions having said two time separations, and means for utilizing said derived signal energy only when said time separations of the pulse wave form portions thereof correspond to a particular traffic sector and zone selectable at said receiver.

4. In a system for communication between two spaced wave-signal stations at least one of which is carried by a mobile object and which includes means for transmitting wave-signal energy modulated by a signal of pulse wave form having a separation between a first pair of pulses thereof of controllable value designating individual ones of a plurality of traffic sectors available to mobile objects and having a separation between another pair of pulses thereof designating individual ones of a plurality of traffic zones located primarily within each of the traffic sectors individually designated by said first pair of said signal pulses, a wave signal receiver comprising: means for intercepting said wave-signal energy; demodulation means for deriving from said intercepted wave-signal energy first, intermediate, and last pulses having said two time separations; two time-delay means having longer and shorter time delays respectively for obtaining from said derived pulses respectively long delayed and short delayed pulses; and means coupled to said demodulation means and to said two time-delay means for utilizing said derived pulses only when the first long delayed pulse, the intermediate short delayed pulse, and the last derived pulse are effectively in time coincidence, said longer and shorter time delays being selected so that said longer delay corresponds to the longer of said two time separations and said shorter delay corresponds to the time difference between said two time separations when said time separations designate a particular traffic sector and zone selectable at said receiver.

5. A system for communication between two spaced wave-signal stations at least one of which is carried by a mobile object comprising: means at one of said stations for transmitting wave signal energy having a first characteristic variable over a given range of values for designating by the values thereof individual ones of a plurality of traffic sectors available to mobile objects and having a second pair of characteristics variable over two ranges of values for designating by one of said two ranges of values individual ones of a plurality of traffic zones located primarily within each of the traffic sectors individually designated by said first characteristic and for designating by the other of said two ranges of values a region near the boundary of two adjoining ones of said traffic zones; means at the other of said stations for intercepting said wave-signal energy and for deriving therefrom signals having a characteristic of which three values represent individual ones of the values of said three characteristics; and means at said other station for utilizing said last-mentioned signals only when two values of said characteristic thereof correspond to a particular traffic sector and zone selectable at said other station or when the third of said values corresponds to a region near the boundary of a traffic zone adjoining said particular traffic zone selectable at said other station.

6. A system for communication between two spaced wave-signal stations at least one of which is carried by a mobile object comprising: means at one of said stations transmitting wave-signal energy having a first modulation characteristic including two pulse wave form portions with a variable time separation for designating by the values of the time separations thereof individual ones of a plurality of traffic sectors available to mobile objects, said wave-signal energy having a second modulation characteristic including one of said two pulse wave form portions and including another pulse wave form portion with a variable time separation designating by the values of the time separations thereof individual ones of a plurality of traffic zones located primarily within each of the traffic sectors individually designated by said first characteristic, said wave-signal energy also having a third modulation characteristic including said one of said two pulse wave form portions with a variable time separation designating by the values of the time separations thereof individual regions near the boundaries of two adjoining ones of said traffic zones; means at the other of said stations for intercepting said wave-signal energy and for deriving therefrom signal energy including four pulse wave form portions having said three time separations; and means at said other station for utilizing said derived signal energy only when the time separations of the pulse wave form portions thereof correspond to a particular traffic sector and zone selectable at said other station or to a region near the boundary of a traffic zone adjoining said selectable traffic zone.

ARTHUR V. LOUGHREN.

REFERENCES CITED

The following references are of record in the file of this patent:

UNITED STATES PATENTS

| Number | Name | Date |
|---|---|---|
| 2,378,604 | Wallace | June 19, 1945 |
| 2,403,603 | Korn | July 9, 1946 |
| 2,480,123 | Deloraine et al. | Aug. 30, 1949 |
| 2,483,097 | McIlwain | Sept. 27, 1949 |
| 2,490,268 | Herbst | Dec. 6, 1949 |